United States Patent
Peer et al.

(10) Patent No.: US 10,009,330 B1
(45) Date of Patent: Jun. 26, 2018

(54) METHOD, APPARATUS AND ARTICLE OF MANUFACTURE FOR FAST TRACKING AUTHENTICATION

(71) Applicant: EMC Corporation, Hopkinton, MA (US)

(72) Inventors: Oded Peer, Raanana (IL); Nir Moatty, Raanana (IL); Yana Vaisman, Natanya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 219 days.

(21) Appl. No.: 14/870,350

(22) Filed: Sep. 30, 2015

(51) Int. Cl.
*G06F 7/04* (2006.01)
*H04L 29/06* (2006.01)

(52) U.S. Cl.
CPC ............ *H04L 63/08* (2013.01); *H04L 63/102* (2013.01)

(58) Field of Classification Search
CPC .............................. H04L 63/08; H04L 63/102
USPC .............................................................. 726/4
See application file for complete search history.

(56) References Cited

U.S. PATENT DOCUMENTS 9,461,980 B1 * 10/2016 Agrawal ................. H04L 63/08
2007/0244919 A1 * 10/2007 Wells ..................... G06Q 10/10

\* cited by examiner

*Primary Examiner* — Kambiz Zand
*Assistant Examiner* — Aubrey Wyszynski
(74) *Attorney, Agent, or Firm* — Jason A. Reyes; Krishnendu Gupta

(57) ABSTRACT

Disclosed are techniques for use in authentication. In one embodiment, the techniques comprise a method. The method comprises the step of receiving a request comprising a plurality of attributes. The method also comprises determining whether to grant authentication or to perform an assessment of at least some of the attributes. The said determination is dependent on whether one of the attributes corresponds with a predictor.

12 Claims, 2 Drawing Sheets

METHOD, APPARATUS AND ARTICLE OF MANUFACTURE FOR FAST TRACKING AUTHENTICATION

TECHNICAL FIELD

The present invention relates generally to techniques for fast tracking authentication.

BACKGROUND OF THE INVENTION

Service providers receive login attempts from users wishing to gain access to sensitive information, such as bank accounts. Some users attempt to gain access to such information with credentials obtained fraudulently from a legitimate account holder.

Adaptive authentication techniques identify fraudulent users even though such users possess credentials to gain access to a legitimate user's account information. For example, each login attempt is received at the service provider at a particular time, and in many cases, a fraudulent user will send login attempts at times outside of those expected by a service provider. Existing adaptive authentication techniques compare information associated with a login attempt received by the service provider, such as the time of the login and a location from where the login originated, with a historical record of a typical user who exhibits some expected login behavior. For example, if a high percentage of prior login attempts received by the service provider from a particular user occur between the hours of 6 AM and 11 PM daily and from locations within the continental United States, then login attempts between 2 AM and 4 AM from locations across Eastern Europe, have a high risk of being a fraudulent user.

Unfortunately, at least some of the adaptive authentication techniques deployed can have high average response times. For example, adaptive authentication techniques perform computations that sometimes result in a 500 ms response time. This problem only worsens as the load on the system increases and the techniques deployed get more complex.

Traditionally, the problem of high average response times has been addressed by adding hardware resources which execute computations faster (e.g., fast processors, SSD drives, etc.). However, the addition of hardware resources can be expensive. It is also extremely time-consuming to make such additions.

A need, therefore, exists for techniques for improving average response times in adaptive authentication systems.

SUMMARY OF THE INVENTION

There is disclosed a method, comprising: receiving a request comprising a plurality of attributes; and determining whether to grant authentication or to perform an assessment of at least some of the attributes, wherein the said determination is dependent on whether one of the attributes corresponds with a predictor.

There is also disclosed an apparatus, comprising: a memory; and at least one hardware device, coupled to the memory, operative to: receive a request comprising a plurality of attributes; and determine whether to grant authentication or to perform an assessment of at least some of the attributes, wherein the said determination is dependent on whether one of the attributes corresponds with a predictor.

There is further disclosed an article of manufacture, comprising a non-transitory machine readable recordable medium containing one or more programs which when executed implement the steps of: receiving a request comprising a plurality of attributes; and determining whether to grant authentication or to perform an assessment of at least some of the attributes, wherein the said determination is dependent on whether one of the attributes corresponds with a predictor.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

The present invention relates to fast tracking authentication in adaptive authentication systems. According to one aspect of the invention, an adaptive authentication system includes two risk assessment models, a "fast" model (e.g., rules-based model) using a small number of genuine predictors that sort the events into a category of "no need to further investigate", and a "full" model (e.g., Bayesian model) which performs typical adaptive authentication computations as will be described further below. The "fast" model should sort a large amount of the events (likely over 50%) into the category of "no need to further investigate", and should be used for login events, which are the majority of the events processed by adaptive authentication. This should significantly improve average response times. Monetary events should always use the "full" model.

It is important to understand that such an approach as described above might have a negative impact on fraud detection during login; however, fraud is not a one-time event as it includes many events entering the system until money is taken (e.g., from someone who stole the credentials, from someone who bought the credentials, from someone who acts performs the money transfer, etc.), and some of these events will most likely be processed by the "full" model.

Figure 1:
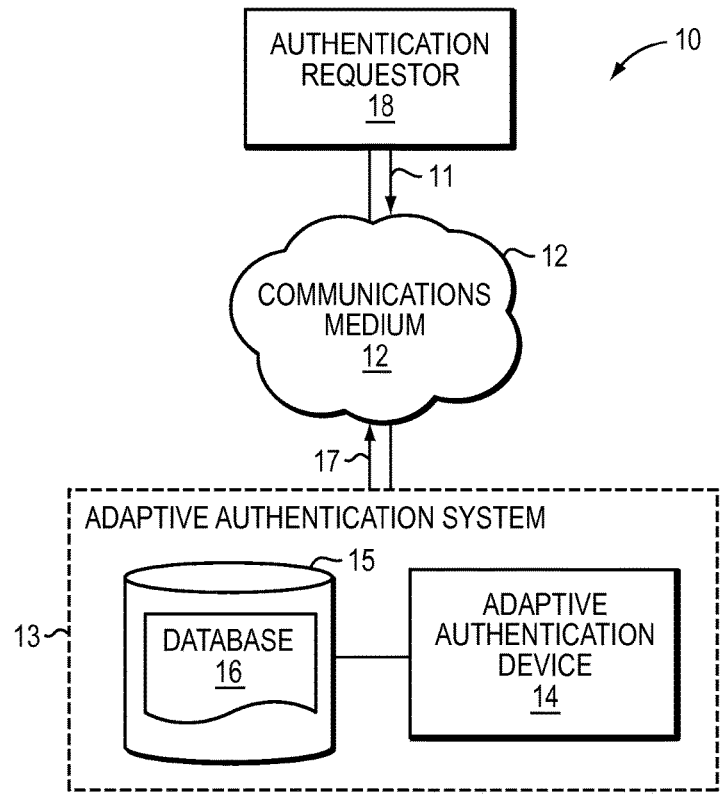
FIG. 1 is a schematic diagram illustrating an electronic environment in which the present invention can be implemented.

FIG. 1 illustrates an electronic environment 10 for carrying out the improved technique. Electronic environment 10 includes communications medium 12, authentication requestor 18 and adaptive authentication system 13.

Communication medium 12 provides connections between adaptive authentication system 13 and authentication requestor 18. The communications medium 12 may implement a variety of protocols, such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive, from a user, requests to access a resource and send, to adaptive authentication system 13, request 11 to authenticate the user. Authentication requestor 18 is further constructed and arranged to receive an adaptive authentication result 17 which indicates whether the user is a high risk of being a fraudulent user.

Request 11 comprises a plurality of attributes. For example, the request 11 may take the form of a message that includes various facts and their values; such messages are embedded in a payload of a data packet. Request 11 typically includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains a profile for a user. Database 16 includes a set of entries, each entry of which includes a user identifier, a time period and user data.

Adaptive authentication device 14 is constructed and arranged to perform adaptive authentication operations on request 11 according to the improved technique and takes the form of a desktop computer, laptop, server or tablet computer. Specifically, adaptive authentication device 14 receives request 11 from authentication requestor 18 and accesses the profile having a user identifier matching the username of request 11. Further detail concerning adaptive authentication device 14 are described below with regard to FIG. 2.

Figure 2:
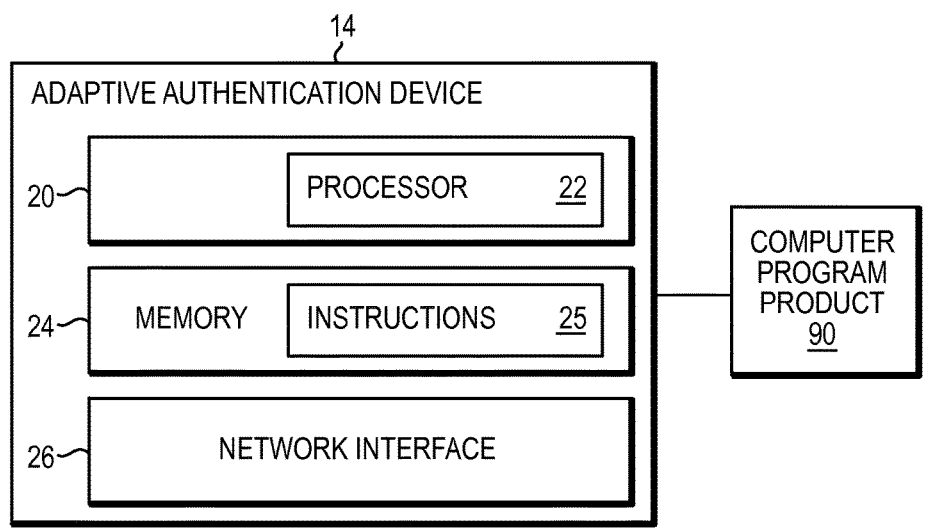
FIG. 2 is a schematic diagram illustrating an adaptive authentication device within the electronic environment shown in FIG. 1.

FIG. 2 illustrates components of adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database 16. Further details regarding the generation of adaptive authentication result 17 are described below.

During operation, authentication requestor 18 sends request 11 to adaptive authentication device 14 via network interface 26. Processor 22 stores data such as the username, fact values and timestamp from request 11 in memory 24. Processor 22 accesses database 16 to perform a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and non-overlapping. For example, while one entry has a time interval which ends at the current time and began at 12 AM the previous Sunday, another entry has a time interval which ends at 11:59 PM the previous Saturday and begins at 12 AM the Sunday prior, and so on.

In some arrangements, in order to limit memory consumption in storage device 15, the number of entries having user identifiers matching the username is limited to those having time intervals corresponding to the current time period and the four most recent previous time periods. Thus, returning to the above example, when at 12 AM Sunday, processor 22 creates a new entry in database 16 having a user identifier matching the username, processor 22 also deletes a corresponding entry having a time interval which is five weeks older than the newly created entry.

Processor 22 then combines the fact values stored in memory 24 with the fact values in the entry of database 16 that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication" and/or U.S. Pat. No. 8,370,389, entitled "Techniques for Authenticating Users of Massive Multiplayer Online Role Playing Games Using Adaptive Authentication," each incorporated by reference herein.

Figure 3:
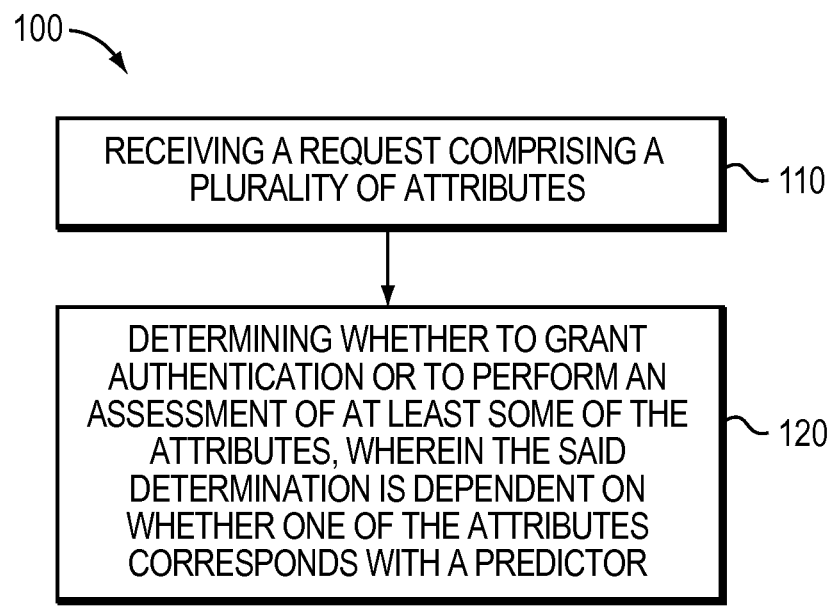
FIG. 3 is a flow chart describing an exemplary implementation of a process that incorporates aspects of the present invention.

FIG. 3 is a flow chart describing an exemplary implementation of a process 100 that incorporates aspects of the present invention. As shown in FIG. 3, the exemplary process 100 initially receives an authentication request 11 during step 110 from the authentication requestor 18. As discussed above, the request 11 comprises a plurality of attributes. The process 100 then determines 120 whether to grant authentication or to perform an assessment of at least some of the attributes. The determination is dependent on whether one of the attributes corresponds with a predictor.

It should be appreciated that the predictor may be an indicator as to the riskiness of one of the attributes. The predictor may have been associated with a previous request or may have been enrolled by user. Alternatively, the adaptive authentication device 14 may have identified a pattern that resulted in the classification of a predictor. In any event, such a predictor is stored in the database 16, and identifiable by a lookup operation, for enabling fast tracking of certain requests 11. For example, the predictor may comprise a genuine attribute associated with a device used to submit a previously successful genuine request. This example predictor may enable future requests from this device to be fast tracked and authentication granted without processing and assessing all the attributes associated with the request. The adaptive authentication server 14 will of course notify the requestor 18 of the result 17. The adaptive authentication server 14 will also update the profile asynchronously after a response is returned to the requestor.

On the other hand, if one of the attributes associated with the request does not correspond to the predictor then further assessment of at least some of the attributes will be required.

For example, the assessment may be performed by comparing current user data associated with the request with the historical data, in a known manner. Such operations may involve analyzing a user's attributes (e.g., the user's device address, ISP address, location, etc.). Additionally, such operations may involve analyzing certain behavior characteristics of the user's sessions (e.g., a comparison of time of day, length of session, purchase habits, and other activity). Accordingly, the adaptive authentication server 14 is able to evaluate potential risks of fraud (i.e., generate risk scores) and provide result 17 to the requester 18 to allow the requester 18 to take action (e.g., contact the user, temporarily deny/disable the user's account, etc.).

In use, the process 100 will only fast track the request 11 if the said request is part of a login event to access a resource and the attribute associated with the request corresponds to the predictor. By fast tracking, login access rights are granted to a resource, and the response time for dealing with the request 11 is reduced. However, if the request 11 is a login request, and the attribute does not correspond to the attribute, the process 100 may immediately perform an assessment of at least some of the attributes. If the assessment indicates a low risk then authentication may be granted. Conversely, if the risk is high, authentication may be denied.

While the aforementioned paragraph describes fast tracking authentication in one particular instance, it should, however, be understood that if the request 11 is fast tracked, the process 100 may still at a later stage perform a further assessment subject to receiving a second request to perform an action (e.g., a request to transfer an asset such as money, etc.). This further assessment will determine risk that assists in determining whether to allow the action.

While the above description describes the predictor as comprising a genuine attribute, it should be appreciated that the predictor may comprise a malign attribute. For example, the malign attribute may have been associated or linked with a previous request. In such a case, a further assessment of the other attributes will be required.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to adaptive authentication device 14. Some embodiments are directed to a system which processes an authentication request from an authentication requestor. Some embodiments are directed to a method of processing an authentication request from an authentication requestor. Also, some embodiments are directed to a computer program product which enables computer logic to process an authentication request from an authentication requestor.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus, such as CD-ROM, flash memory, disk memory, tape memory, and the like.

As mentioned previously herein, the above-described embodiments of the invention are presented by way of illustrative example only. Numerous variations and other alternative embodiments may be used.

What is claimed is:

1. A method, comprising:
receiving a login request in connection with a computerized resource, wherein the login request comprises a plurality of attributes;
authenticating the login request by assessing an attribute of the plurality of attributes and a predictor associated with authentic or fraudulent activity;
following authentication of the login request, receiving a second request requesting a type of action in connection with the computerized resource;
in response to receiving the second request, determining the authenticity of the second request by evaluating one or more of the remaining attributes of the plurality of attributes not assessed during authentication and corresponding attributes associated with a previous request;
upon determining the authenticity of the second request, permitting the action in connection with the computerized resource.

2. The method as claimed in claim 1, wherein the predictor comprises an authentic attribute associated with a prior request.

3. The method as claimed in claim 1, wherein the predictor comprises a fraudulent attribute associated with a prior request.

4. The method as claimed in claim 1, wherein the action relates to the transfer of an asset.

5. An apparatus, comprising:
a memory; and
at least one hardware device, coupled to the memory, operative to:
receive a login request in connection with a computerized resource, wherein the login request comprises a plurality of attributes;
authenticate the login request by assessing an attribute of the plurality of attributes and a predictor associated with authentic or fraudulent activity;
following authentication of the login request, receive a second request requesting a type of action in connection with the computerized resource;
in response to receiving the second request, determine the authenticity of the second request by evaluating one or more of the remaining attributes of the plurality of attributes not assessed during authentication and corresponding attributes associated with a previous request;
upon determining the authenticity of the second request, permit the action in connection with the computerized resource.

6. The apparatus as claimed in claim 5, wherein the predictor comprises an authentic attribute associated with a prior request.

7. The apparatus as claimed in claim 5, wherein the predictor comprises a fraudulent attribute associated with a prior request.

8. The apparatus as claimed in claim 5, wherein the action relates to the transfer of an asset.

9. An article of manufacture, comprising a non-transitory machine readable recordable medium containing one or more programs which when executed implement the steps of:

receiving a login request in connection with a computerized resource, wherein the login request comprises a plurality of attributes;

authenticating the login request by assessing an attribute of the plurality of attributes and a predictor associated with authentic or fraudulent activity;

following authentication of the login request, receiving a second request requesting a type of action in connection with the computerized resource;

in response to receiving the second request, determining the authenticity of the second request by evaluating one or more of the remaining attributes of the plurality of attributes not assessed during authentication and corresponding attributes associated with a previous request;

upon determining the authenticity of the second request, permitting the action in connection with the computerized resource.

10. The article of manufacture as claimed in claim 9, wherein the predictor comprises an authentic attribute associated with a prior request.

11. The article of manufacture as claimed in claim 9, wherein the predictor comprises a fraudulent attribute associated with a prior request.

12. The article of manufacture as claimed in claim 9, wherein the action relates to the transfer of an asset.

* * * * *